United States Patent [19]

Yamashita et al.

[11] Patent Number: 4,818,736
[45] Date of Patent: Apr. 4, 1989

[54] HIGH DIELECTRIC CONSTANT TYPE CERAMIC COMPOSITION

[75] Inventors: Yohachi Yamashita, Yokohama; Osamu Furukawa, Sagamihara; Mitsuo Harata, Kawasaki; Takashi Takahashi, Tokyo, all of Japan

[73] Assignee: Kabushiki Kaisha Toshiba, Kawasaki, Japan

[21] Appl. No.: 157,149

[22] Filed: Feb. 11, 1988

Related U.S. Application Data

[63] Continuation of Ser. No. 791,060, Oct. 24, 1985, abandoned.

[30] Foreign Application Priority Data

Oct. 25, 1984 [JP] Japan .................. 59-222924
Dec. 28, 1984 [JP] Japan .................. 59-274754

[51] Int. Cl.$^4$ ............................ C04B 35/46
[52] U.S. Cl. .................. 501/136; 501/135; 501/134; 361/321
[58] Field of Search ............ 501/134, 135, 136; 361/320, 321

[56] References Cited

U.S. PATENT DOCUMENTS

| | | | |
|---|---|---|---|
| 4,265,668 | 5/1981 | Fujiwara et al. | 501/134 |
| 4,339,544 | 7/1982 | Sakabe et al. | 501/136 |
| 4,536,821 | 8/1985 | Wheeler et al. | 361/321 |

FOREIGN PATENT DOCUMENTS

| | | | |
|---|---|---|---|
| 103304 | 3/1984 | European Pat. Off. | 252/62.9 R |
| 2519970 | 7/1983 | France . | |
| 49-4280 | 1/1974 | Japan | 501/134 |
| 50519 | 1/1975 | Japan | 252/62.9 R |
| 57-25607 | 2/1982 | Japan | 501/134 |
| 57-188456 | 11/1982 | Japan | 501/134 |
| 2035994 | 6/1980 | United Kingdom . | |
| 2137187 | 10/1984 | United Kingdom . | |

OTHER PUBLICATIONS

S. Nomura et al., "Dielectric and Piezoelectric Properties in The Ternary System of Pb(Zn$_\frac{1}{3}$Nb$_\frac{2}{3}$)O$_3$Ba(Zn$_\frac{1}{3}$Nb$_\frac{2}{3}$)O$_3$PbTiO$_3$", *Japanese Journal of Applied Physics,* vol. 11, Mar. 1972, pp. 358-364.

"Capacitors, Chip, Multiple . . . Specification For", Military Specification, MIL-C-55681B, Jun. 17, 1987, pp. 1-5.

"Ceramic Dielectric Capacitors", EIA Standard, RS-198-C Electronic Industries Association, (11/83), p. 108.

M. Yonezawa, Low-Firing Multilayer Capacitor Materials, Nippon Electric. Co., Ltd., vol. 62, No. 12, pp. 1375-1383.

*Primary Examiner*—Jacqueline V. Howard
*Assistant Examiner*—Ann M. Knab
*Attorney, Agent, or Firm*—Foley & Lardner, Schwartz, Jeffery, Schwaab, Mack, Blumentahal & Evans

[57] ABSTRACT

When a portion of the Pb of a Pb(Zn$_\frac{1}{3}$Nb$_\frac{2}{3}$)O$_3$-based ceramic composition within the region bounded by lines connecting a, b, c and d points in the ternary composition diagram of the accompanying FIG. 1 is substituted by a small amount of Ba and/or Sr, a high dielectric constant type ceramic composition which has a small temperature coefficient of dielectric constant and which is effective as a material for multilayer ceramic capacitors is obtained.

17 Claims, 11 Drawing Sheets

F I G. I $(Pb_{1-\alpha} Me_\alpha)(Zn_{1/3} Nb_{2/3})O_3$

Me = Ba, Sr $(Pb_{1-\alpha}Me_\alpha)[(Zn_{1/3}Nb_{2/3})_{0.5}(Mg_{1/3}Nb_{1/3})_{0.5}]O_3$ Me = Ba, Sr

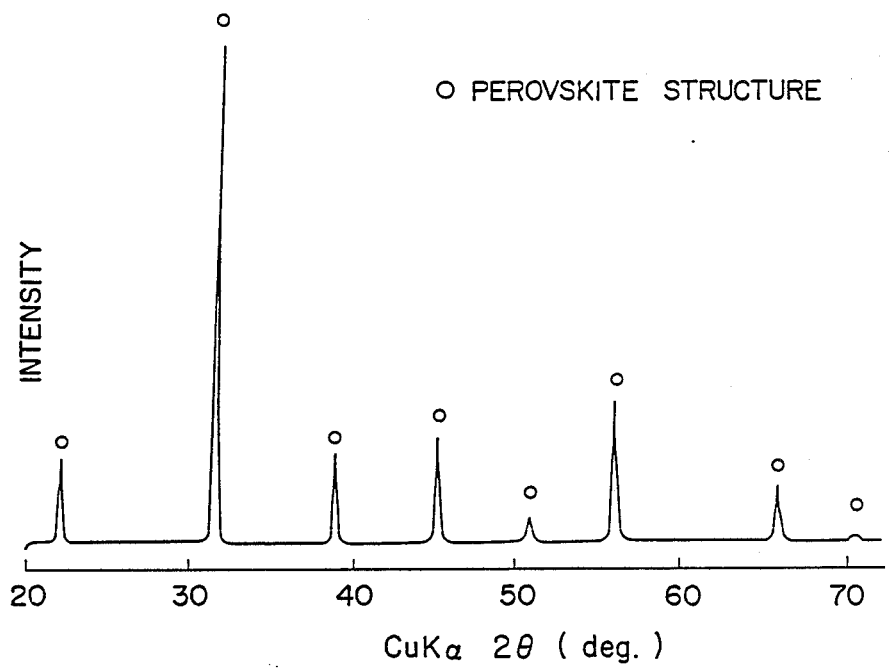
F I G. 10
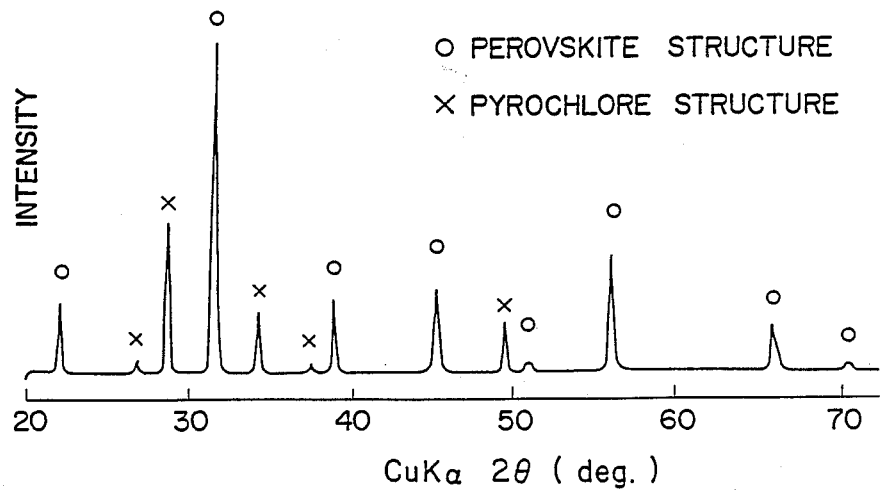
F I G. 11

HIGH DIELECTRIC CONSTANT TYPE CERAMIC COMPOSITION

This application is a continuation of application Ser. No. 719,060, filed Oct. 24, 1985, abandoned.

BACKGROUND OF THE INVENTION

This invention relates to high dielectric constant type ceramic compositions, and more particularly to $Pb(Zn_{\frac{1}{3}}Nb_{\frac{2}{3}})O_3$-based high dielectric constant type ceramic compositions which exhibit small temperature dependence of its temperature coefficient of dielectric constant (T.C.C.).

Electrical characteristics which must be considered for dielectric materials include dielectric constant, temperature coefficient of dielectric constant, dielectric loss, bias electric field dependence of dielectric constant, capacitance-resistance product and the like.

In particular, it is necessary that the capacitance-resistance product (CR product) be amply high. A specification of Electric Industrial Association of Japan (EIAJ), RC-3698B, for multilayer ceramic capacitors (chip-type) for electronic equipment stipulates that the CR product be at least 500 MΩ.μF at room temperature. It is required to maintain the high CR product even at higher temperatures so that capacitors can be used under even more severe conditions. (For example, the United States Department of Defense, Military Industrial Regulation MIL-C-55681B stipulates a CR product at 85° C. or 125° C.)

Further, it is required that the temperature coefficient of dielectric constant be small. In general, materials having large dielectric constants (K) tend to exhibit large T.C.C. values, and it is required that the ratio of K to T.C.C. be large, i.e., the relative value of the variation in the dielectric constant be small.

In the case of elements of multilayer structure, it is necessary to use internal electrode materials which can withstand even at the sintering temperature of dielectric materials because the electrode layer and the dielectric layer are co-fired. Accordingly, if the sintering temperature of the dielectric precious metals is high, expensive materials such as platinum (Pt) or palladium (Pd) must be used not to react with each other. Therefore, a requirement is that sintering be possible at lower temperatures of the order of 1100° C. or below so that inexpensive metal such as silver (Ag) based alloy can be used.

A known high dielectric constant type ceramic composition is a solid solution containing barium titanate ($BaTiO_3$) as the base and stannates, zirconates, titanates, etc. It is certainly possible to obtain a composition having a high dielectric constant, but such a composition has problems. If the dielectric constant becomes high, then T.C.C. becomes large. Further, the bias electric field dependence becomes large. Furthermore, the sintering temperature of the $BaTiO_3$-type materials is high, being of the order of 1,300° to 1,400° C. Out of unavoidable necessity, expensive precious metals such as platinum and palladium which can withstand high temperatures must be used as the internal electrode materials. Thus, capacitor cost increases with increasing capacitance.

In order to overcome the problems of the $BaTiO_3$-based materials, extensive studies are being carried out on a variety of low-firing type compositions. For example, Japanese Patent Laid-Open Pub. No. 57204/1980 discloses a $Pb(Fe_{\frac{1}{2}}Nb_{\frac{1}{2}})O_3$-based composition; Japanese Patent Laid-Open Pub. No. 51758/1980 discloses a $Pb(Mg_{\frac{1}{3}}Nb_{\frac{2}{3}})O_3$-based composition; and Japanese Patent Laid-Open Pub. No. 21662/1977 discloses a $Pb(Mg_{\frac{1}{2}}W_{\frac{1}{2}})O_3$-based composition.

The $Pb(Fe_{\frac{1}{2}}Nb_{\frac{1}{2}})O_3$-based composition exhibits the following problems. The change of the CR product due to the sintering temperature is quite large. Particularly, the decreasing of the CR product at a higher temperature such as at 85° C. is large. The $Pb(Mg_{\frac{1}{3}}Nb_{\frac{2}{3}})O_3$-based composition requires a relatively high sintering temperature. Further, the $Pb(Mg_{\frac{1}{2}}W_{\frac{1}{2}})O_3$-based composition exhibits the following problems. If the CR product is large, then the dielectric constant is small. If the dielectric constant is large, then the CR product is small. Furthermore, the T.C.C. of these materials is superior to that of the barium titanate, but it is insufficient.

Further, Japanese Patent Laid-Open Pub. No. 121959/1980 discloses a composition comprising a solid solution of $Pb(Mg_{\frac{1}{3}}Nb_{\frac{2}{3}})O_3$ and lead titanate wherein if necessary a portion of Pb, less than 10 mol %, is substituted by barium, strontium or calcium. However, the T.C.C. of this composition cannot be said to be sufficient, the T.C.C. of the best composition being −59.8% at a temperature of from −25° to 85° C. Further, Japanese Patent Laid-Open Pub. No. 121959/1980 mentioned above does not describe the CR product which is the most important property of a capacitor material. Then the usefulness as a capacitor material is uncertain.

Further, Japanese Patent Laid-Open Pub. No. 25607/1982 discloses a solid solution of $Pb(Mg_{\frac{1}{3}}Nb_{\frac{2}{3}})O_3$ and $Pb(Zn_{\frac{1}{3}}Nb_{\frac{2}{3}})O_3$. However, this publication neither describes the CR product nor T.C.C. Thus, the usefulness of the material as a capacitor material is also uncertain.

Furthermore, Japanese Patent Laid-Open Pub. No. 214201/1983 discloses a composition comprising a solid solution of $Pb(Zn_{\frac{1}{3}}Nb_{\frac{2}{3}})O_3$ and $Pb(Ni_{\frac{1}{3}}Nb_{\frac{2}{3}})O_3$ wherein if necessary a portion of lead less than 10 mol % is substituted by barium, strontium or calcium. However, the temperature coefficient of dielectric constant of this material is insufficient, and the temperature coefficient of dielectric constant of the best material is −33% at a temperature of from −25° to 85° C. Furthermore, this publication does not describe the CR product. Thus, the usefulness of the material as a capacitor material is uncertain.

An object of the present invention is therefore to provide a high dielectric constant type ceramic composition having a large dielectric constant with a small temperature coefficient and high CR product thereof.

SUMMARY OF THE INVENTION

The present invention is directed to a high dielectric constant type ceramic composition characterized in that when this ceramic composition is represented by the general formula:

$$xPb(Zn_{\frac{1}{3}}Nb_{\frac{2}{3}})O_3-yPb(Mg_{\frac{1}{3}}Nb_{\frac{2}{3}})O_3-zPbTiO_3,$$

a portion of the Pb of the composition within lines connecting the following points a, b, c, and d of the ternary composition diagram shown in the accompanying FIG. 1 having apexes of respective components, is substituted by 1 to 35 mole % of at least one of barium and strontium:

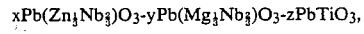

a: (x=0.50, y=0.00, z=0.50)

b: (x=1.00, y=0.00, z=0.00)

c: (x=0.20, y=0.80, z=0.00)

d: (x=0.05, y=0.90, z=0.05).

A variety of perovskite-type ceramic materials have been long studied for use as dielectric materials. It has been believed that when $Pb(Zn_{\frac{1}{3}}Nb_{\frac{2}{3}})O_3$ is formed into ceramics, it does not readily take the perovskite structure but pyrochlore structure with low K value and is not suitable for a dielectric material. (See NEC Research & Development No. 29, April, 1973, pp. 15-21)

We have found that a stable perovskite structure can be formed in ceramics by substituting the Pb sites of $Pb(Zn_{\frac{1}{3}}Nb_{\frac{2}{3}})O_3$ with a suitable amount of Ba or Sr. Further, we have found that such a ceramic composition exhibits a very high dielectric constant with small T.C.C. and very high insulation resistance, and its temperature characteristics are extremely good. Furthermore, we have found that the ceramic composition has excellent mechanical strength. As a result of further studies, we have now found that a high dielectric constant type ceramic composition which combines a higher dielectric constant and higher insulation resistance can be obtained by using this $Pb(Zn_{\frac{1}{3}}Nb_{\frac{2}{3}})O_3$ in combination with $Pb(Mg_{\frac{1}{3}}Nb_{\frac{2}{3}})O_3$ and $PbTiO_3$.

BRIEF DESCRIPTION OF THE DRAWINGS

In the drawings:

FIGS. 10, 11, 12 and 13 are X-ray diffraction patterns of strength.

DESCRIPTION OF THE PREFERRED EMBODIMENTS

The compositional ranges of the composition according to the present invention will now be described.

Me, i.e., Ba or Sr is an element necessary for forming a perovskite structure having the general formula given hereinbefore. If the amount of Me is less than 1 mole %, then a pyrochlore structure will coexist, and the resulting ceramic composition will not exhibit a high dielectric constant and high insulation resistance. If the amount of Me is more than 35 mole %, the dielectric constant will become small, of the order of 1,000 or below, or the sintering temperature will become high, of the order of 1,100° C. or above. Accordingly, when the amount substituted by the Me component is represented by $(Pb_{1-\alpha}Me_{\alpha})$, $\alpha$ is of the magnitude of $0.01 < \alpha < 0.35$.

In the case of dielectric materials, the Curie temperature is set at about room temperature (0°–30° C.) in order to obtain a high capacitance at room temperature. While the Me component of the present invention is an essential component for forming a perovskite structure as described above, it also acts as a shifter which shifts the Curie temperature of the ceramic composition according to the present invention. Further, the Me component significantly increases insulation resistance and improves mechanical strength and break down voltage.

The amount of Pb substituted by the Me component can be suitably set with consideration of Curie temperature and other factors. In regions containing a large amount of $Pb(Zn_{\frac{1}{3}}Nb_{\frac{2}{3}})O_3$ and lead titanate (x>0.5, and z>0.1), the use of at least 10 mole % of the Me component is preferred. In regions containing a large amount of $Pb(Mg_{\frac{1}{3}}Nb_{\frac{2}{3}})O_3$ (y>0.6, and z<0.05), the use of at least 1 mole % of the Me component causes its substitution effect to be amply exhibited.

Figure 1:
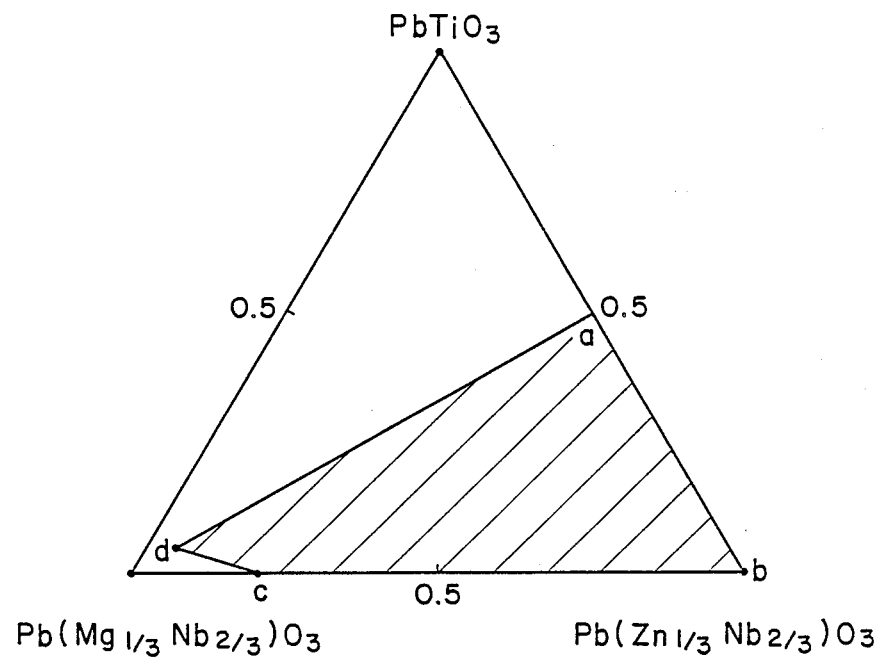
FIG. 1 is a ternary composition diagram indicating the compositional ranges of ceramic compositions according to this invention.

The compositional range of the ceramic composition according to the present invention is shown in FIG. 1. At the portion outside the segment a–d, the sintering temperature may be as high as 1,100° C. or higher, and the insulation resistance is decreased. Thus, a high CR product cannot be obtained.

Further, at the portion outside the segment c–d, the Curie temperature is originally about room temperature, and therefore the substitution by the Me component greatly shifts the Curie temperature to a lower temperature side to greatly reduce the dielectric constant at room temperature. In the case of $d_1$(x=0.10, y=0.80, z=0.10), portions present on the inner side of the segment c–$d_1$ are more preferable.

While the addition of a small amount of $Pb(Mg_{\frac{1}{3}}Nb_{\frac{2}{3}})O_3$ causes its effect to be exhibited, in actual practice, the incorporation of at least 1 mole % of $Pb(Mg_{\frac{1}{3}}Nb_{\frac{2}{3}})O_3$ is desirable.

Further, in consideration of the CR product, a content of $Pb(Zn_{\frac{1}{3}}Nb_{\frac{2}{3}})O_3$ of at least 15 mole % is preferable, more preferably at least 20 mole %. When its content is at least 20 mole %, the dielectric loss is particularly small.

In the case of $c_1$(x=0.40, y=0.60, z=0.00), $d_2$(x=0.15, y=0.70, z=0.15), $d_3$(x=0.20, y=0.60, z=0.20) and $c_2$(x=0.45, y=0.55, z=0.00), at the outer side of a segment $c_1$–$d_1$, it is relatively difficult to obtain dense ceramics.

Thus, in consideration of the CR product, T.C.C., sintability, mechanical strength and the like, the inner side of a segment $c_1$–$d_2$, particularly the inner side of a segment $c_2$–$d_2$, and more particularly the inner side of a segment $c_2$–$d_3$ are preferred. However, when the dielectric constant and the like are taken into consideration, even the compositional systems partitioned by such segments have ample characteristics.

Figure 2:
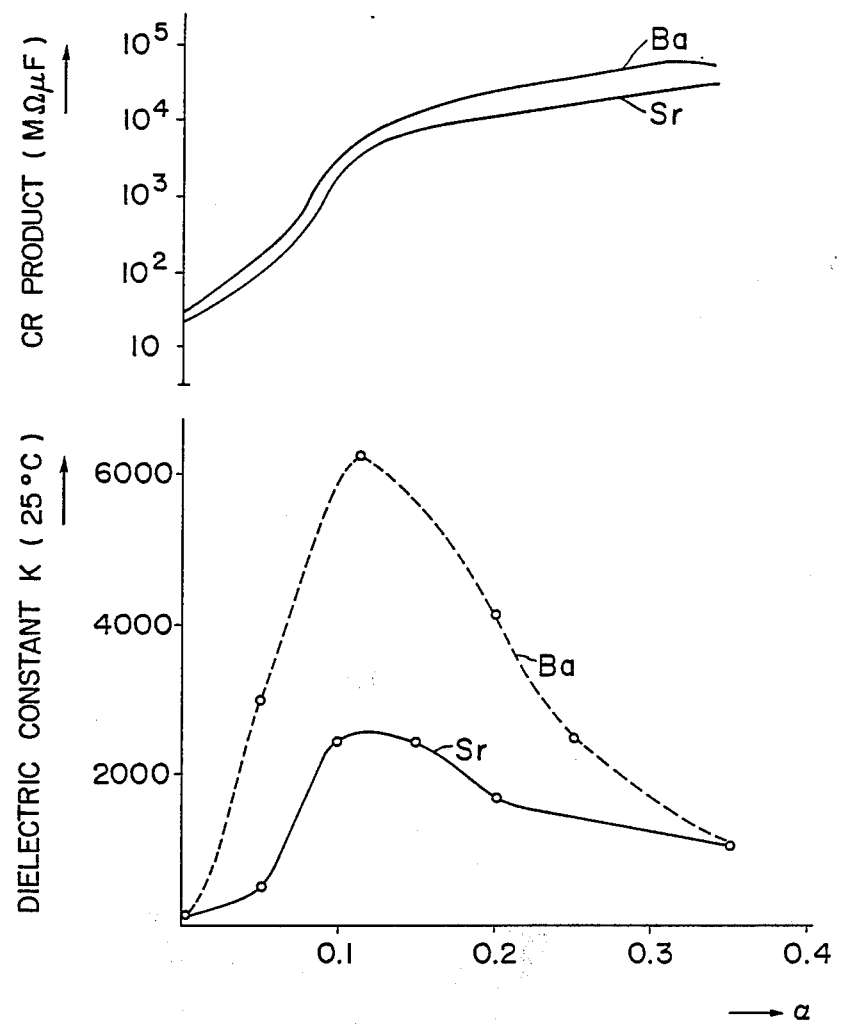
FIGS. 2 and 3 are graphs indicating variations in characteristics of ceramic compositions due to the quantity of Me.

FIG. 2 is a graph indicating the variation in CR product and dielectric constant K of a compositional system $(Pb_{1-\alpha}Me_{\alpha})(Zn_{\frac{1}{3}}Nb_{\frac{2}{3}})O_3$ comprising 100% of $Pb(Zn_{\frac{1}{3}}Nb_{\frac{2}{3}})O_3$ and containing no magnesium and titanium (b point of FIG. 1), due to the amount $\alpha$ of Me (=Ba or Sr) (at 25° C.). If $\alpha$ is less than 0.1, a pyrochlore structure will coexist, and the ceramic composition will not exhibit a high dielectric constant and high insulation resistance. If $\alpha$ is more than 0.35, the dielectric constant will become small, of the order of 1,000, and the sintering temperature will become as high as 1,100° C. or higher. Accordingly, $\alpha$ is made to be $0.1 < \alpha < 0.35$.

As can be seen from FIG. 2, in the case of $0.1 < \alpha < 0.35$, i.e., when a portion of Pb in the formula described above is substituted by from 10 to 35 mole % of at least one of Ba and Sr, the ceramic composition is excellent with respect to each characteristic. Particularly, in the case of $0.16 < \alpha < 0.30$, the CR product is 3,000 M$\Omega \cdot \mu$F or above, and high reliability can be obtained.

In the case of high-K dielectric materials, the Curie temperature is set at about room temperature in order to obtain a high capacitance. When no Mg is contained, i.e., $y=0$, the Me component in the compositional system of the present invention has the effect of decreasing the Curie temperature, whereas Ti has the effect of increasing the Curie temperature. The addition of Ti elevates the dielectric constant in conjunction with the Me component.

However, if the Ti component is excessively large, the insulation resistance will be reduced and the CR product will become small. Accordingly, z which is the Ti amount is of the magnitude of $z < 0.5$. If z is 0.5 or above, the sintering temperature will become as high as 1,100° C. Particularly, in consideration of the effect of Pb(Zn$_{\frac{1}{3}}$Nb$_{\frac{2}{3}}$)O$_3$ which is one of the fundamental components, it is preferable that z be less than 0.4. While even the system ($y=0$, $z=0$) which is free of Mg and Ti affords an amply good high dielectric constant type ceramic composition, a system containing Ti shows its remarkable addition effect when z is more than about 0.05.

Figure 3:
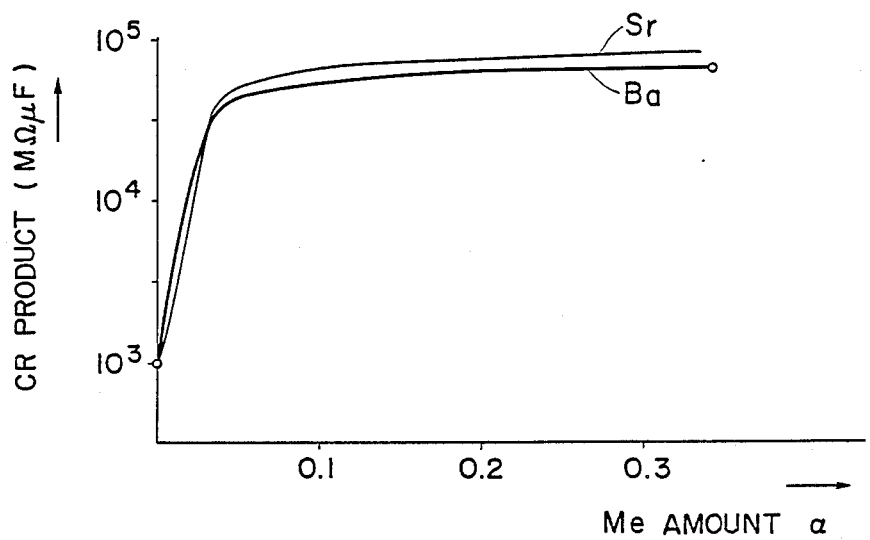
Figure 3:
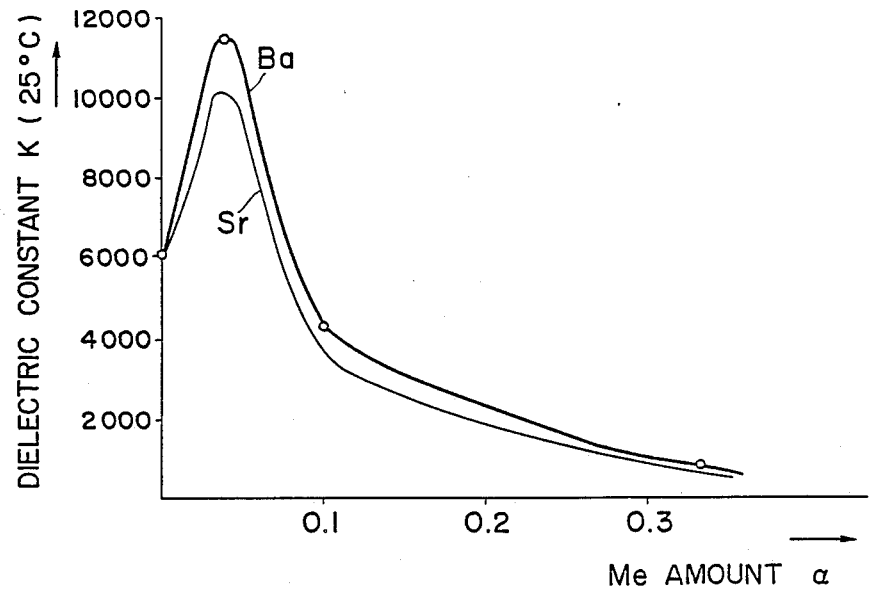

FIG. 3 is a graph indicating the variation in CR product and dielectric constant of a compositional system of 50 mole % of Pb(Zn$_{\frac{1}{3}}$Nb$_{\frac{2}{3}}$)O$_3$ and 50 mole % of Pb(Mg$_{\frac{1}{3}}$Nb$_{\frac{2}{3}}$)O$_3$, i.e., (Pb$_{1-\alpha}$Me$_\alpha$)[Zn$_{\frac{1}{3}}$Nb$_{\frac{2}{3}}$]$_{0.5}$(Mg$_{\frac{1}{3}}$Nb$_{\frac{2}{3}}$)$_{0.5}$]O$_3$, due to the amount $\alpha$ of Me ($=$Ba or Sr). As can be seen from FIG. 3, by adding a small amount ($\alpha=0.01-0.35$) of the Me component, i.e., by substituting a portion of Pb of the composition described above with from 1 to 35 mole % of at least one of Ba and Sr, the characteristics are greatly improved. Particularly, the Cr product is remarkably improved, and such a system makes possible the production of a ceramic capacitor having excellent reliability.

While the present compositions are those based on the material represented by the general formula set forth hereinabove, the stoichiometric ratios may deviate somewhat. When such compositions are converted on the basis of oxides, they are as follows:

PbO: 46.13–69.09 wt %
BaO: 0.00–18.10 wt %
SrO: 0.00–12.99 wt %
ZnO: 0.42–9.13 wt %
Nb$_2$O$_5$: 14.11–29.83 wt %
TiO$_2$: 0.00–14.31 wt %
MgO: 0.00–3.73 wt %

(provided that the sum of BaO and SrO is from 0.32% to 18.10% by weight). It is preferable to contain more than 0.04 wt % of MgO.

Impurities, additives, substituted materials and the like may be present provided that they do not impair the effects of the present invention. Examples of such substances are oxides of transition elements and lanthanide elements such as MnO, CoO, NiO, Sb$_2$O$_3$, ZrO$_2$ and La$_2$O$_3$, CeO$_2$ etc. The content of these additives is at most of the order of 1% by weight.

It is particularly effective when, of these, at least one of manganese oxide (MnO) and cobalt oxide (CoO) is added to and contained in the composition according to the present invention. While such additive-free compositions exhibit amply excellent characteristics when they contain manganese oxide and/or cobalt oxide, remarkable effects such as improvement of breakdown voltage, improvement of T.C.C., and reduction of dielectric loss can be obtained. Further, the aging characteristic of the dielectric constant is also improved. While the adding of a small amount of manganese oxide and/or cobalt oxide can produce such effects, a remarkable effect can be obtained when manganese oxide and/or cobalt oxide are added in an amount of 0.01% by weight or more. However, the addition of a large amount of manganese oxide and/or cobalt oxide reduces greatly the insulation resistance and dielectric constant, and therefore the amount of manganese oxide and/or cobalt oxide prescribed at 0.5% by weight or less.

Processes for producing the compositions of the present invention will now be described.

Oxides of Pb, Ba, Sr, Zn, Nb, Ti and Mg, or precursors which are converted into oxides during sintering, for example, salts such as carbonates and oxalates, hydroxides, and organic compounds are used as starting materials and weighed in specified proportions. These are thoroughly mixed and then calcined. This calcination is carried out at a temperature of the order of 700° to 850° C. If the calcination temperature is too low, the density of ceramics will be lowered. If the calcination temperature is too high, the density of the ceramics will be lowered and the insulation resistance will be decreased.

The calcined material is then pulverized to produce a dielectric material powder. It is preferable that the average grain size of the powder be of the order of 0.5 to 2 micrometers. If the average grain size is too large, pores present in the ceramics will be increased. If the average grain size is too small, then easiness of forming is reduced. Such dielectric material powder is formed into a desired shape. Thereafter, the formed product is sintered to obtain high dielectric constant type ceramics. The sintering can be carried out at a relatively low temperature of the order of 1,100° C. or lower, preferably of the order of 980° to 1,080° C., by using the composition of the present invention.

For production of multilayer ceramic capacitors, the following procedure can be used. A binder, solvent and other additives are added to the dielectric material powder described above to prepare a slurry. The slurry is formed into green sheets, and internal electrodes are printed on the green sheets. Thereafter, the specified number of green sheets are laminated, cut and sintered to produce the elements. Since the dielectric material of the present invention can be sintered at a low temperature, for example, inexpensive Ag or Ag-based alloy such as Ag-Pd alloy or Ag-Pd-Au alloy containing more than 70 wt % of Ag can be used as the internal electrode materials.

Since the compositions of the present invention can be sintered at a low temperature as mentioned above, they are also effective as paste materials for thick film dielectrics which are to be printed on circuit substrates or the like and sintered.

These ceramic compositions of the present invention have high dielectric constants and their T.C.C. values are small. Further, the instant compositions have large CR products, particularly amply high CR products, even at high temperatures, and have excellent reliability at high temperatures.

Low T.C.C. values are an important feature of the present invention, and this is particularly remarkable in the case of dielectric constants as large as K ≧ 10,000. In the case of such large dielectric constants, it is required that the ratio dielectric constant/absolute value of percent temperature change be large. The instant compositions have excellent ratios as mentioned above.

Further, the bias electric field dependence of dielectric constant of the instant compositions is superior to that of the prior art barium titanate material. Materials having percentage changes of dielectric constant of 10% or lower, even under 4 kV/mm, can be obtained. Accordingly, the instant compositions are effective as materials for high voltage capacitor. Further, the dielectric loss of the instant compositions is small, and thus they are also effective as materials for alternating current or for high-frequency wave resonator.

Since the T.C.C. is small as mentioned above, an electrostrictive element exhibiting small displacement on temperature change can be obtained.

Further, the grain size of the ceramics is uniform, being from 1 to 3 micrometers, and therefore the breakdown voltage is excellent.

While the electrical characteristics have been described, the mechanical strength is also amply good.

As stated hereinbefore, according to the present invention, high dielectric constant type ceramic compositions having high dielectric constants, excellent temperature characteristics, and excellent bias characteristics can be obtained. Particularly, ceramics having such excellent characteristics can be obtained by sintering at a low temperature, and therefore the instant compositions are suited for applying to ceramic elements of multilayer type such as multilayer ceramic capacitors and multilayer-type ceramic displacement generation elements.

Specific examples of the present invention will now be described.

Starting materials of oxides or carbonates of Pb, Ba, Sr, Zn, Nb, Ti, Mg, Mn and Co were mixed by means of a ball mill or the like in formulating proportions shown in Tables 1 through 4. The mixtures were calcined at a temperature of from 700° to 850° C. The calcined materials were then milled by means of the ball mill or the like and dried to prepare dielectric material powder. A binder was added to the powder. The resulting mixture was granulated and pressed to form dishlike specimens each having a diameter of 17 mm and a thickness of approximately 2 mm. In order to prevent contamination of impurities, it is preferable that balls having great hardness and toughness such as partially stabilized zirconia balls be used as the balls for mixing/milling.

These formed specimens were sintered for several hours in air at a temperature of from 980° to 1,080° C. and silver electrodes were printed on the main surfaces of the sintered specimens. Their characteristics were measured. Their dielectric loss and capacitance were measured by means of a digital LCR meter under 1 KHz and 1 Vrms at 25° C. Their dielectric constant was calculated from the data of the capacitance measured and the dimensions of specimen. Further, their insulation resistance was calculated from the data obtained by applying a voltage of 100 V for 2 minutes, and measuring it by means of an insulation resistance meter. T.C.C. is expressed by using a value at 25° C. as a standard and examining the percentage change at −25° C. and 85° C., respectively. Capacitance-resistance product was determined from (dielectric constant)×(insulation resistance)×(dielectric constant in vacuo) at 25° C. and 125° C., respectively. The measurement of insulation resistance was carried out in silicone oil in order to exclude the effect of moisture in air. The results are shown in Tables 1 through 4.

Table 1 shows Examples 1 through 28 wherein y=0, i.e., they have the composition present on a segment a-b of FIG. 1.

Table 2 shows Examples 31 through 58 having compositions within other ranges of the present invention.

Table 3 shows Examples 61 through 65 wherein at least one of manganese oxide and cobalt oxide is additionally added.

For comparison, Table 4 shows Reference Examples 1 through 11 having compositions outside the range of the present invention.

In Examples 1 through 28, the values of y and MgO are zero and therefore such values are omitted in Table 1.

TABLE 1

| Sample No. | Me = Ba (mole %) | Me = Sr (mole %) | x (mole %) | z (mole %) | PbO (wt %) | BaO (wt %) | SrO (wt %) | ZnO (wt %) | Nb$_2$O$_5$ (wt %) | TiO$_2$ (wt %) |
|---|---|---|---|---|---|---|---|---|---|---|
| Example | | | | | | | | | | |
| 1 | 12 | 0 | 100 | 0 | 59.42 | 5.57 | — | 8.21 | 20.81 | — |
| 2 | 0 | 11 | 100 | 0 | 60.98 | — | 3.50 | 8.33 | 27.20 | — |
| 3 | 15 | 0 | 100 | 0 | 57.76 | 7.00 | — | 8.26 | 26.98 | — |
| 4 | 0 | 15 | 100 | 0 | 59.10 | — | 4.84 | 8.45 | 27.60 | — |
| 5 | 20 | 0 | 100 | 0 | 54.95 | 9.44 | — | 8.35 | 27.27 | — |
| 6 | 0 | 20 | 100 | 0 | 56.68 | — | 6.58 | 8.61 | 28.13 | — |
| 7 | 25 | 0 | 100 | 0 | 52.07 | 11.93 | — | 8.44 | 27.56 | — |
| 8 | 0 | 25 | 100 | 0 | 54.17 | — | 8.38 | 8.78 | 28.67 | — |
| 9 | 3 | 8 | 95 | 5 | 61.03 | 1.41 | 2.55 | 7.92 | 25.86 | 1.23 |
| 10 | 14 | 0 | 95 | 5 | 58.63 | 6.56 | — | 7.87 | 25.71 | 1.22 |
| 11 | 0 | 20 | 95 | 5 | 57.01 | — | 6.62 | 8.22 | 26.87 | 1.28 |
| 12 | 16 | 0 | 90 | 10 | 57.84 | 7.57 | — | 7.53 | 24.60 | 2.46 |
| 13 | 20 | 0 | 90 | 10 | 55.56 | 9.54 | — | 7.60 | 24.81 | 2.49 |
| 14 | 0 | 20 | 90 | 10 | 57.33 | — | 6.65 | 7.84 | 25.61 | 2.57 |
| 15 | 18 | 0 | 85 | 15 | 57.02 | 8.60 | — | 7.18 | 23.46 | 3.73 |
| 16 | 0 | 15 | 85 | 15 | 60.11 | — | 4.92 | 7.30 | 23.86 | 3.80 |
| 17 | 25 | 0 | 85 | 15 | 52.96 | 12.13 | — | 7.29 | 23.83 | 3.79 |
| 18 | 0 | 20 | 85 | 15 | 57.67 | — | 6.69 | 7.45 | 24.32 | 3.87 |
| 19 | 10 | 10 | 80 | 20 | 57.08 | 4.90 | 3.31 | 6.93 | 22.66 | 5.11 |
| 20 | 0 | 20 | 80 | 20 | 58.00 | — | 6.73 | 7.05 | 23.03 | 5.19 |
| 21 | 20 | 0 | 80 | 20 | 56.19 | 9.65 | — | 6.83 | 22.31 | 5.03 |
| 22 | 25 | 0 | 80 | 20 | 53.26 | 12.20 | — | 6.90 | 22.55 | 5.08 |
| 23 | 0 | 20 | 75 | 25 | 58.34 | — | 6.77 | 6.65 | 21.71 | 6.53 |
| 24 | 25 | 0 | 75 | 25 | 53.51 | 12.27 | — | 6.51 | 21.26 | 6.39 |

TABLE 1-continued

| | | | | | | | | | | |
|---|---|---|---|---|---|---|---|---|---|---|
| 25 | 0 | 21 | 70 | 30 | 58.18 | — | 7.18 | 6.26 | 20.47 | 7.91 |
| 26 | 24 | 0 | 70 | 30 | 54.47 | 11.82 | — | 6.10 | 19.92 | 7.70 |
| 27 | 27 | 0 | 60 | 40 | 53.29 | 13.54 | — | 5.32 | 17.39 | 10.45 |
| 28 | 33 | 0 | 50 | 50 | 50.19 | 16.98 | — | 4.55 | 14.87 | 13.41 |

(bis)

| Sample No. | Dielectric Constant K 25° C. | Dielectric Loss D.F. (%) | Capacitance-Resistance Product CR 25° C.(ΩF) | Capacitance-Resistance Product CR 125° C.(ΩF) | Temperature Coefficient of Dielectric Constant T.C.C. −25° C.(%) | Temperature Coefficient of Dielectric Constant T.C.C. +85° C.(%) | K/T.C.C. |
|---|---|---|---|---|---|---|---|
| Example | | | | | | | |
| 1 | 6,300 | 1.60 | 1,900 | 500 | −30 | −16 | 210 |
| 2 | 2,600 | 0.20 | 1,100 | 260 | −4 | −18 | 144 |
| 3 | 6,400 | 0.83 | 4,200 | 2,100 | +1 | −21 | 305 |
| 4 | 2,600 | 0.05 | 3,000 | 1,080 | +17 | −23 | 113 |
| 5 | 4,100 | 0.06 | 7,000 | 1,900 | +24 | −23 | 171 |
| 6 | 1,610 | 0.04 | 17,000 | 1,400 | +18 | −22 | 73 |
| 7 | 2,500 | 0.05 | 9,900 | 2,000 | +22 | −29 | 86 |
| 8 | 1,400 | 0.03 | 25,000 | 1,900 | +21 | −32 | 44 |
| 9 | 5,800 | 1.50 | 2,200 | 300 | −29 | −20 | 200 |
| 10 | 6,500 | 1.30 | 2,900 | 2,000 | −21 | −21 | 310 |
| 11 | 2,100 | 0.01 | 23,000 | 1,300 | +19 | −24 | 88 |
| 12 | 6,900 | 1.20 | 5,000 | 3,000 | −15 | −17 | 406 |
| 13 | 6,200 | 0.95 | 7,700 | 2,900 | +6 | −25 | 248 |
| 14 | 3,500 | 0.40 | 19,000 | 2,700 | +11 | −25 | 140 |
| 15 | 6,300 | 0.82 | 6,500 | 4,000 | −8 | −19 | 332 |
| 16 | 3,900 | 1.1 | 4,200 | 1,600 | −8 | −9.5 | 411 |
| 17 | 3,500 | 0.3 | 12,000 | 4,000 | +29 | −23 | 113 |
| 18 | 4,050 | 0.7 | 11,000 | 2,200 | +4 | −31 | 131 |
| 19 | 5,500 | 1.1 | 9,900 | 2,400 | +3 | −21 | 262 |
| 20 | 4,800 | 0.8 | 14,000 | 1,400 | +5 | −29 | 166 |
| 21 | 6,200 | 0.6 | 5,600 | 1,700 | −6 | −21 | 295 |
| 22 | 5,500 | 0.4 | 6,900 | 2,400 | +13 | −23 | 239 |
| 23 | 5,200 | 1.2 | 7,500 | 1,900 | −9 | −12 | 433 |
| 24 | 4,500 | 0.3 | 11,00 | 1,200 | +14 | −22 | 205 |
| 25 | 5,000 | 1.6 | 9,900 | 1,400 | −18 | −16 | 278 |
| 26 | 6,500 | 0.8 | 4,600 | 1,030 | −9 | −23 | 283 |
| 27 | 8,500 | 2.4 | 3,500 | 1,100 | −32 | −25 | 266 |
| 28 | 7,200 | 1.8 | 1,400 | 300 | −31 | −31 | 232 |

TABLE 2

| Sample No. | Me = Ba (mol %) | Me = Sr (mol %) | x (mol %) | y (mol %) | z (mol %) | PbO (wt %) | BaO (wt %) | SrO (wt %) | MgO (wt %) | ZnO (wt %) | $Nb_2O_5$ (wt %) | $TiO_2$ (wt %) |
|---|---|---|---|---|---|---|---|---|---|---|---|---|
| Exam. | | | | | | | | | | | | |
| 31 | 12 | 0 | 99 | 1 | 0 | 59.45 | 5.57 | 0 | 0.04 | 8.13 | 26.82 | 0 |
| 32 | 0 | 18 | 80 | 1 | 19 | 58.95 | 0 | 6.01 | 0.04 | 6.99 | 23.12 | 4.89 |
| 33 | 24 | 0 | 70 | 0.5 | 29.5 | 54.45 | 11.81 | 0 | 0.02 | 6.09 | 20.05 | 7.67 |
| 34 | 27 | 0 | 60 | 2 | 38 | 53.22 | 13.52 | 0 | 0.09 | 5.32 | 17.94 | 9.92 |
| 35 | 33 | 0 | 50 | 1 | 49 | 50.15 | 16.97 | 0 | 0.05 | 4.55 | 15.15 | 13.13 |
| 36 | 0 | 8 | 80 | 20 | 0 | 62.87 | 0 | 2.54 | 0.82 | 6.64 | 27.13 | 0 |
| 37 | 0 | 5 | 60 | 40 | 0 | 64.75 | 0 | 1.58 | 1.64 | 4.97 | 27.06 | 0 |
| 38 | 5 | 0 | 50 | 50 | 0 | 64.53 | 2.33 | 0 | 2.04 | 4.13 | 26.97 | 0 |
| 39 | 4 | 0 | 41 | 59 | 0 | 65.31 | 1.87 | 0 | 2.42 | 3.39 | 27.01 | 0 |
| 40 | 1 | 0 | 30 | 70 | 0 | 67.23 | 0.47 | 0 | 2.86 | 2.48 | 26.96 | 0 |
| 41 | 0 | 1 | 20 | 80 | 0 | 67.62 | 0 | 0.32 | 3.29 | 1.66 | 27.11 | 0 |
| 42 | 3 | 0 | 10 | 80 | 10 | 67.17 | 1.43 | 0 | 3.34 | 0.84 | 24.74 | 2.48 |
| 43 | 0 | 3 | 15 | 70 | 15 | 67.58 | 0 | 0.97 | 2.94 | 1.27 | 23.51 | 3.74 |
| 44 | 16 | 0 | 30 | 40 | 30 | 60.18 | 7.88 | 0 | 1.73 | 2.61 | 19.91 | 7.69 |
| 45 | 0 | 19 | 40 | 20 | 40 | 60.44 | 0 | 6.58 | 0.90 | 3.63 | 17.77 | 10.68 |
| 46 | 5 | 8 | 80 | 10 | 10 | 60.51 | 2.39 | 2.58 | 0.42 | 6.76 | 24.85 | 2.49 |
| 47 | 11 | 0 | 60 | 30 | 10 | 61.39 | 5.21 | 0 | 1.25 | 5.03 | 24.65 | 2.47 |
| 48 | 10 | 0 | 50 | 40 | 10 | 62.21 | 4.75 | 0 | 1.66 | 4.20 | 24.70 | 2.47 |
| 49 | 0 | 8 | 40 | 50 | 10 | 64.38 | 0 | 2.60 | 2.11 | 3.40 | 25.00 | 2.51 |
| 50 | 7 | 0 | 30 | 60 | 10 | 64.42 | 3.33 | 0 | 2.50 | 2.53 | 24.75 | 2.48 |
| 51 | 15 | 0 | 60 | 20 | 20 | 59.56 | 7.22 | 0 | 0.84 | 5.11 | 22.25 | 5.02 |
| 52 | 0 | 11 | 40 | 40 | 20 | 63.44 | 0 | 3.64 | 1.72 | 3.46 | 22.64 | 5.10 |
| 53 | 20 | 0 | 50 | 20 | 30 | 57.33 | 9.85 | 0 | 0.86 | 4.35 | 19.91 | 7.70 |
| 54 | 0 | 20 | 90 | 5 | 5 | 57.13 | 0 | 6.63 | 0.22 | 7.81 | 26.93 | 1.28 |
| 55 | 8 | 0 | 35 | 55 | 10 | 63.73 | 3.81 | 0 | 2.29 | 2.95 | 24.75 | 2.48 |
| 56 | 5 | 1 | 40 | 55 | 5 | 64.57 | 2.36 | 0.32 | 2.27 | 3.34 | 25.91 | 1.23 |
| 57 | 11 | 0 | 20 | 60 | 20 | 62.89 | 5.34 | 0 | 2.55 | 1.72 | 22.44 | 5.06 |
| 58 | 1 | 0 | 5 | 90 | 5 | 68.17 | 0.47 | 0 | 3.73 | 0.42 | 25.97 | 1.23 |

(bis)

| Sample No. | Dielectric Constant K 25° C. | Dielectric Loss D.F. (%) | CR Product 25° C. (ΩF) | CR Product 125° C. (ΩF) | Temperature Coefficient of Dielectric Constant T.C.C. −25° C.(%) | Temperature Coefficient of Dielectric Constant T.C.C. +85° C.(%) | K/T.C.C. |
|---|---|---|---|---|---|---|---|

TABLE 2-continued

| Example | | | | | | | |
|---|---|---|---|---|---|---|---|
| 31 | 6,400 | 1.1 | 8,500 | 1,100 | −32 | −17 | 200 |
| 32 | 4,900 | 0.8 | 27,000 | 4,700 | −14 | −12 | 350 |
| 33 | 6,500 | 0.7 | 17,000 | 3,300 | −10 | −19 | 342 |
| 34 | 8,400 | 1.9 | 15,000 | 2,600 | −31 | −26 | 271 |
| 35 | 7,200 | 1.6 | 9,800 | 1,900 | −31 | −32 | 225 |
| 36 | 5,200 | 0.3 | 15,200 | 3,100 | −14 | −29 | 179 |
| 37 | 7,200 | 0.9 | 17,000 | 3,900 | −19 | −29 | 248 |
| 38 | 11,000 | 0.4 | 34,000 | 6,000 | −35 | −41 | 268 |
| 39 | 13,000 | 0.6 | 19,600 | 4,100 | −40 | −47 | 277 |
| 40 | 16,600 | 1.9 | 4,800 | 1,200 | −54 | −50 | 307 |
| 41 | 8,500 | 3.4 | 3,800 | 980 | −35 | −30 | 243 |
| 42 | 11,000 | 3.2 | 1,900 | 350 | −49 | −40 | 224 |
| 43 | 12,000 | 2.7 | 2,800 | 700 | −53 | −40 | 226 |
| 44 | 11,000 | 1.7 | 9,600 | 2,200 | −41 | −38 | 268 |
| 45 | 8,300 | 1.5 | 9,900 | 2,400 | −32 | −29 | 259 |
| 46 | 6,500 | 0.6 | 22,000 | 3,300 | −14 | −14 | 464 |
| 47 | 8,200 | 0.9 | 19,000 | 2,700 | −22 | −18 | 372 |
| 48 | 9,900 | 0.8 | 22,000 | 3,200 | −12 | −44 | 225 |
| 49 | 10,500 | 0.4 | 27,000 | 4,600 | −31 | −40 | 263 |
| 50 | 12,600 | 0.8 | 14,000 | 2,900 | −42 | −49 | 257 |
| 51 | 8,300 | 0.5 | 21,000 | 3,500 | −27 | −29 | 286 |
| 52 | 9,500 | 0.2 | 17,000 | 3,400 | −17 | −23 | 413 |
| 53 | 12,500 | 0.2 | 12,000 | 2,200 | −12 | −47 | 266 |
| 54 | 2,200 | 0.01 | 34,000 | 4,500 | +21 | −25 | 104 |
| 55 | 12,000 | 0.9 | 22,000 | 3,900 | −43 | −48 | 250 |
| 56 | 14,000 | 1.1 | 23,000 | 4,000 | −54 | −50 | 259 |
| 57 | 12,000 | 1.4 | 18,000 | 3,300 | −48 | −42 | 250 |
| 58 | 14,500 | 3.1 | 1,900 | 400 | −49 | −43 | 296 |

TABLE 3

| Sample No. | Me = Ba (mol %) | Me = Sr (mol %) | x (mol %) | y (mol %) | z (mol %) | MnO (wt %) | CoO (wt %) | Dielectric Constant 25° C. | Dielectric Loss 25° C. (%) | CR Product 25° C. (ΩF) | Temperature Coefficient of Dielectric Constant (%) −25° C. | +85° C. | Breakdown Voltage (KV/mm) |
|---|---|---|---|---|---|---|---|---|---|---|---|---|---|
| Example | | | | | | | | | | | | | |
| 61 | 0 | 15 | 85 | 0 | 15 | 0.20 | 0 | 4,500 | 0.30 | 3,100 | −13 | −11 | 33 |
| 62 | 5 | 0 | 50 | 50 | 0 | 0.02 | 0.02 | 11,000 | 0.35 | 38,000 | −35 | −40 | 26 |
| 63 | 5 | 0 | 50 | 50 | 0 | 0.10 | 0 | 10,600 | 0.30 | 30,000 | −35 | −39 | 30 |
| 64 | 0 | 3 | 10 | 80 | 10 | 0 | 0.10 | 10,000 | 2.00 | 4,800 | −43 | −35 | 28 |
| 65 | 26 | 1 | 60 | 2 | 38 | 0.05 | 0.05 | 8,800 | 1.00 | 17,000 | −29 | −26 | 28 |

TABLE 4

| Sample No. | Me = Ba (mol %) | Me = Sr (mol %) | x (mol %) | y (mol %) | z (mol %) | PbO (wt %) | BaO (wt %) | SrO (wt %) | MgO (wt %) | ZnO (wt %) | Nb₂O₅ (wt %) | TiO₂ (wt %) |
|---|---|---|---|---|---|---|---|---|---|---|---|---|
| Ref. Exam. | | | | | | | | | | | | |
| 1 | 0 | 0 | 100 | 0 | 0 | 65.85 | 0 | 0 | 0 | 8.00 | 26.14 | 0 |
| 2 | 0 | 0 | 80 | 20 | 0 | 66.39 | 0 | 0 | 0.80 | 6.45 | 26.36 | 0 |
| 3 | 0 | 0 | 60 | 40 | 0 | 66.94 | 0 | 0 | 1.61 | 4.88 | 26.57 | 0 |
| 4 | 0 | 0 | 40 | 60 | 0 | 67.48 | 0 | 0 | 2.44 | 3.28 | 26.79 | 0 |
| 5 | 0 | 0 | 20 | 80 | 0 | 68.05 | 0 | 0 | 3.28 | 1.65 | 27.02 | 0 |
| 6 | 0 | 0 | 85 | 0 | 15 | 66.92 | 0 | 0 | 0 | 6.91 | 22.58 | 3.59 |
| 7 | 0 | 0 | 10 | 80 | 10 | 68.80 | 0 | 0 | 3.31 | 0.84 | 24.58 | 2.46 |
| 8 | 36 | 0 | 40 | 0 | 60 | 48.87 | 18.89 | 0 | 0 | 3.71 | 12.13 | 16.40 |
| 9 | 42 | 0 | 20 | 0 | 80 | 46.08 | 22.93 | 0 | 0 | 1.93 | 6.31 | 22.75 |
| 10 | Commercially available BaTiO₃ K = 12,000 1,350° C. sintering | | | | | | | | | | | |
| 11 | Commercially available BaTiO₃ K = 2,000 1,350° C. sintering | | | | | | | | | | | |

(bis)

| Sample No. | Dielectric Constant K 25° C. | Dielectric Loss D.F.(%) | CR Product 25° C.(ΩF) | CR Product 125° C.(ΩF) | Temperature Coefficient of Dielectric Constant T.T.C. −25° C.(%) | +85° C.(%) | K/T.C.C. |
|---|---|---|---|---|---|---|---|
| Ref. Exam. | | | | | | | |
| 1 | 155 | 8.5 | 0.5 | 0.9 | −20 | +38 | 4.1 |
| 2 | 1,000 | 2.6 | 30 | 5 | −28 | +85 | 11.8 |
| 3 | 4,500 | 3.8 | 620 | 50 | −50 | +66 | 68 |
| 4 | 9,850 | 5.8 | 2.530 | 450 | −67 | +3 | 147 |
| 5 | 6,600 | 2.6 | 4,850 | 660 | −47 | −38 | 140 |
| 6 | 990 | 2.6 | 150 | 50 | −30 | +40 | 37.5 |
| 7 | 7,800 | 4.5 | 1,350 | 220 | −61 | +69 | 113 |
| 8 | 990 | 2.6 | 490 | 120 | −34 | +340 | 2.9 |
| 9 | 530 | 10.3 | 10 | 0.2 | −34 | +340 | 2.9 |

TABLE 4-continued

| 10 | 12,000 | 1.6 | 14,000 | 970 | −80 | −80 | 150 |
| 11 | 2,000 | 1.2 | 16,000 | 900 | +10 | −8 | 200 |

As can be seen from Tables 1–3, the ceramic compositions of the present invention have high dielectric constants (K=1,400 or above) and good temperature characteristics (within −54% at a temperature of from −25° C. to 85° C.). Their CR products are 1,100 MΩ.μF (25° C.) or above and particularly 260 MΩ.μF or above even at 125° C. Thus, the present compositions have excellent reliability at high temperatures. Their T.C.C.'s are remarkably small in the case of large dielectric constant of, for example, K≧5,000. When the dielectric constant is thus large, it is required that (dielectric constant)/(absolute value of percent temperature change) be large. In the Examples of the present invention, when K is 5,000 or above, this value is 200 or above, and the instant compositions are excellent. Further, the bias electric field dependence of the dielectric constant is within 15% under 1 KV/mm, and thus this property is also excellent. Furthermore, the dielectric loss is as small as 2.4% or lower at 25° C. under 1 KHz.

Moreover, the compositions containing at least 15 mole % of $Pb(Zn_{\frac{1}{3}}Nb_{\frac{2}{3}})O_3$ have a CR product of 2,000 MΩ.μF or higher. Further, the compositions containing at least 20 mole % of $Pb(Zn_{\frac{1}{3}}Nb_{\frac{2}{3}})O_3$ have a CR product of 3,000 MΩ.μF or higher. Thus, these compositions have extremely high values. Furthermore, the compositions containing at least 20 mole % of $Pb(Zn_{\frac{1}{3}}Nb_{\frac{2}{3}})O_3$ have a dielectric loss of 2% or lower. Thus, the dielectric loss is very small.

The Reference Examples shown in Table 4 are outside the range of the instant compositions.

In the case of the Me component-free compositions (Reference Examples 1–7), they have small dielectric constants, extremely small CR products, large dielectric losses, and large T.C.C.'s. Reference Examples 8 and 9 illustrate compositions containing excess Me component. Their dielectric constants are small and have extremely large temperature dependence.

Figure 4:
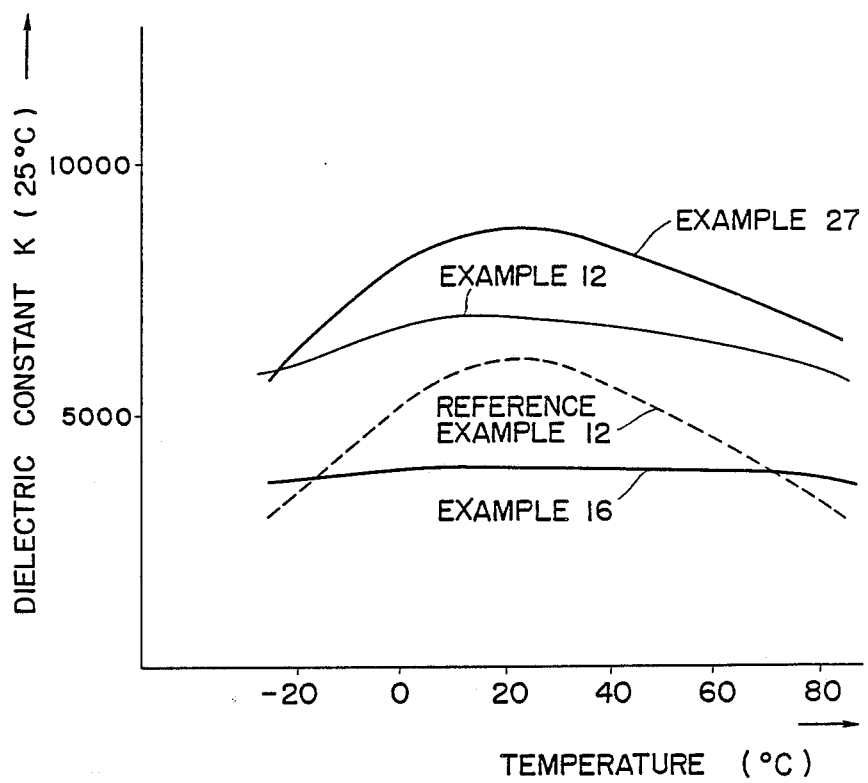
FIGS. 4 and 5 are graphs showing temperature characteristic curves of dielectric constants.
Figure 5:
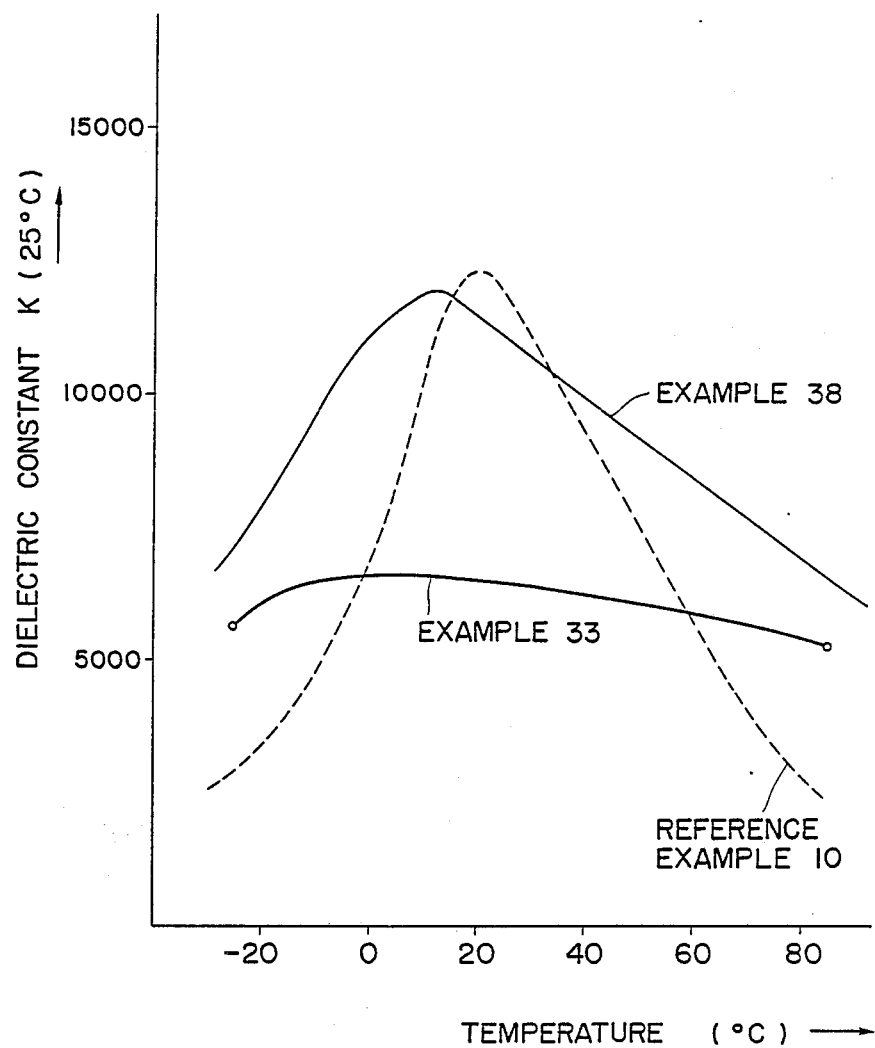

FIGS. 4 and 5 indicate temperature characteristics of dielectric constant. FIG. 4 is a graph wherein Examples containing no Mg and having the composition shown in Table 1 are compared with the corresponding Reference Example. FIG. 5 is a graph wherein Examples containing Mg and having the composition shown in Table 2 are compared with the corresponding Reference Example. For comparison, FIG. 4 shows also the characteristics of a barium titanate-system material $(BaTiO_3)_{0.89}$-$(CaTiO_3)_{0.10}$-$(MgZnO_3)_{0.01}$ (Reference Example 12 which is not shown in the Tables).

While the composition of Reference Example 12 exhibits a large dielectric constant of the order of 6,000 at 25° C., it exhibits a percent variation of at least −50% at −25° C. and 85° C. In contrast, the instant composition having a K of 8,500 at 25° C. (Example 27) exhibits a percent variation within only −32%, and the instant composition having a K of 3,900 at 25° C. (Example 16) exhibits a percent variation of −9.5%. Thus, the percent variation of the instant composition of Example 16 is extremely small.

For comparison, FIG. 5 shows also the characteristics of a barium titanate-system material for a commercially available multilayer capacitor (Reference Example 10). While the composition of Reference Example 10 exhibits a large dielectric constant of the order of 12,000 at 25° C., it exhibits a T.C.C. of at least −80% at −25° C. and 85° C. In contrast, the composition of the present invention having a K of 11,000 at 25° C. (Example 38) exhibits a T.C.C. within only −41%, and the instant composition having a K of 6,500 at 25° C. (Example 33) exhibits a T.C.C. within −20%. Thus, the T.C.C. of this composition of Example 33 is extremely small.

In the case of this T.C.C., the positive variation with respect to the value at room temperature is regarded as more important than the negative variation. The materials exhibiting a percent variation of at least +30% do not satisfy any standard specification for capacitors of EIA, EIAJ and JIS, and are quite impractical as capacitor materials. For example, in the case of a material wherein $Pb(Ni_{\frac{1}{3}}Nb_{\frac{2}{3}})O_3$ is used in place of $Pb(Mg_{\frac{1}{3}}Nb_{\frac{1}{3}})O_3$ and lead titanate to produce $0.3PbNi_{\frac{1}{3}}Nb_{\frac{2}{3}}O_3$-$0.7PbZn_{\frac{1}{3}}Nb_{\frac{2}{3}}O_3$, and 10 atomic % of Pb is substituted by Ba, its percent variation at −25° C. is +35%, and therefore such a material is quite impractical as a capacitor material. Similarly, the materials of Reference Examples 1, 2, 3, 6, 7, 8 and so forth are quite impractical as capacitor materials.

Figure 6:
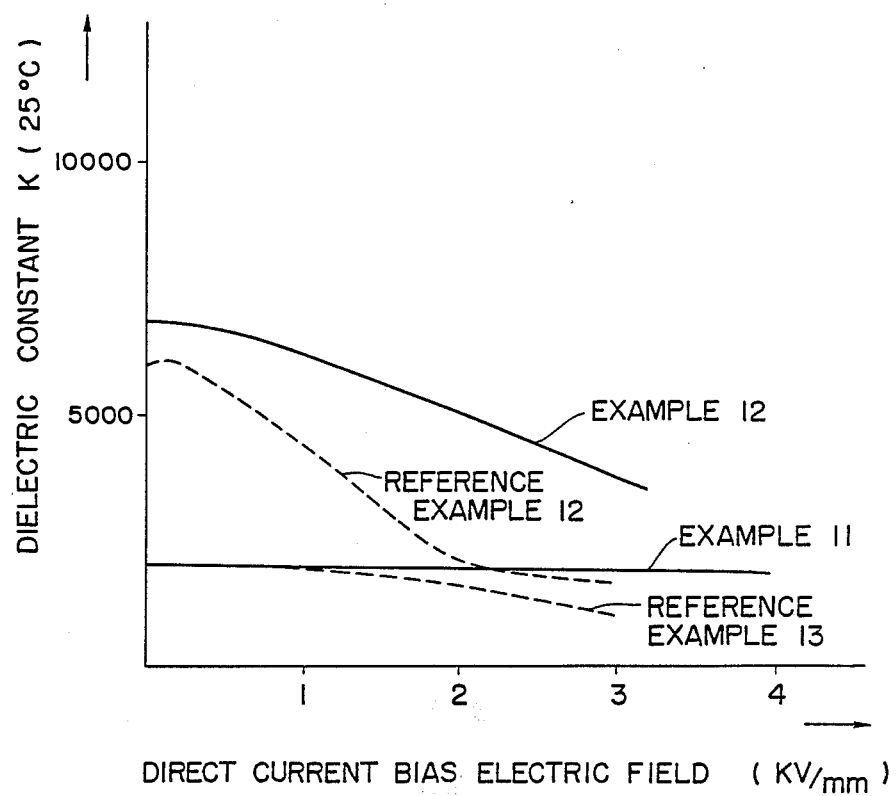
FIGS. 6 and 7 are graphs showing direct-current bias electric field characteristic curves of dielectric constants.
Figure 7:
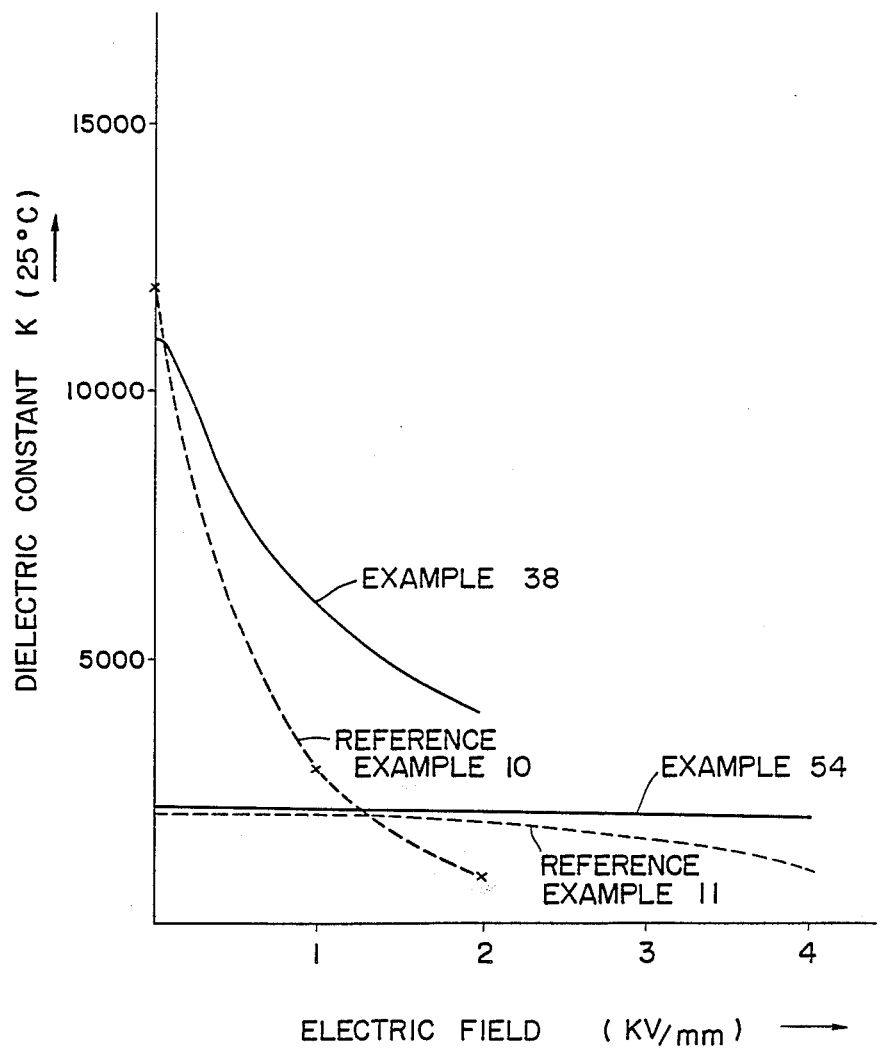

FIGS. 6 and 7 are graphs illustrating direct current bias electric field dependence of dielectric constant. FIG. 6 is a graph wherein Examples containing no Mg and having the composition shown in Table 1 are compared with the corresponding Reference Examples. FIG. 7 is a graph wherein Examples having the composition shown in Table 2 are compared with the corresponding Reference Examples. In general, the dielectric constant tends to decrease with increasing bias electric field, and this tendency becomes remarkable as the dielectric constant is high.

As can be seen from FIG. 6, the dielectric constant of the composition of Reference Example 12 is of the order of 6,000. The dielectric constant is reduced by −25% and −63% under 1 KV/mm and 2 KV/mm, respectively. Thus, the material of Reference Example 12 has a dielectric constant which exhibits a tendency to decrease greatly. While the material of Example 12 has a large dielectric constant of 6,900, the dielectric constant is reduced by only −11% under 1 KV/mm, and by only about −28% even under 2 KV/mm.

As can be seen from FIG. 7, the dielectric constant of the material of Reference Example 10 is of the order of 12,000. The dielectric constant is reduced by −80% and −93% under 1 KV/mm and 2 KV/mm, respectively. Thus, the material of Reference Example 10 exhibits a tendency to greatly decrease. While the material of Example 8 has a dielectric constant substantially equal to that of Reference Example 10, i.e., 11,000, the dielectric constant is reduced by only −45% under 1 KV/mm, and by only −64% under 2 KV/mm.

While barium titanate (Reference Example 13 which is not shown in the Tables) exhibits a dielectric constant of the same order as that of Example 11, it exhibits a percent variation of −50% under 3 KV/mm. In contrast, the material of Example 11 exhibits a percent variation of −10%, which is extremely small. Similarly, barium titanate (Reference Example 11) exhibits a dielectric constant of the same order as that of Example 54. However, the material of Reference Example 11 exhibits a percent variation of −50% under 4 KV/mm, whereas the percent variation of Example 54 is −10%, which is extremely small.

Thus, the compositions of the present invention having small direct current bias electric field dependence are useful as capacitor materials for high voltage. When a multilayer capacitor is to be obtained and when its capacitance is to be increased with the same shape, it is necessary to reduce the thickness of each dielectric layer. In this case, the applied electric field per layer becomes high. However, the composition of the present invention has excellent bias characteristics, and therefore the characteristics are not impaired even if it is applied to such elements. Further, the dielectric loss of the sample of Example 54 is 0.01%, which is extremely small. Accordingly, the sample of Example 54 is suitable for alternating current.

Figure 8:
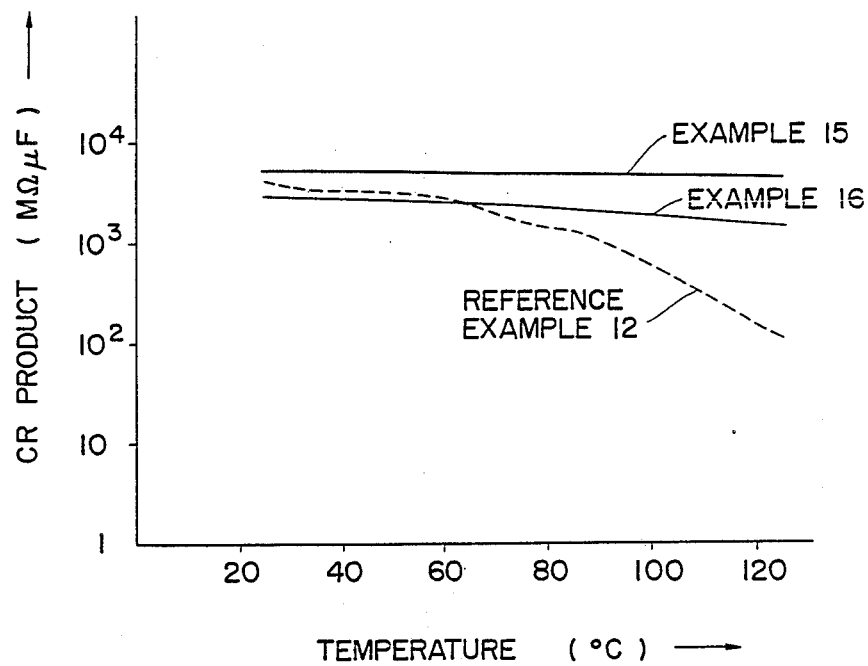
FIG. 8 is a graph showing temperature characteristic curves of CR product.

FIG. 8 indicates temperature characteristics of CR products. In the case of the present invention, the decreasing of CR products is slight even at high temperatures. The samples of Examples 15 and 16 exhibit CR products of 4,000 MΩ.μF (125° C.) and 1,600 MΩ.μF (125° C.), respectively. Thus, these samples exhibit very high CR products, and their reliability is excellent. While the sample of Reference Example 12 exhibits a high CR product of about 4,000 MΩ.μF at room temperature, the CR product at 125° C. is greatly reduced to 100 MΩ.μF.

Figure 9:
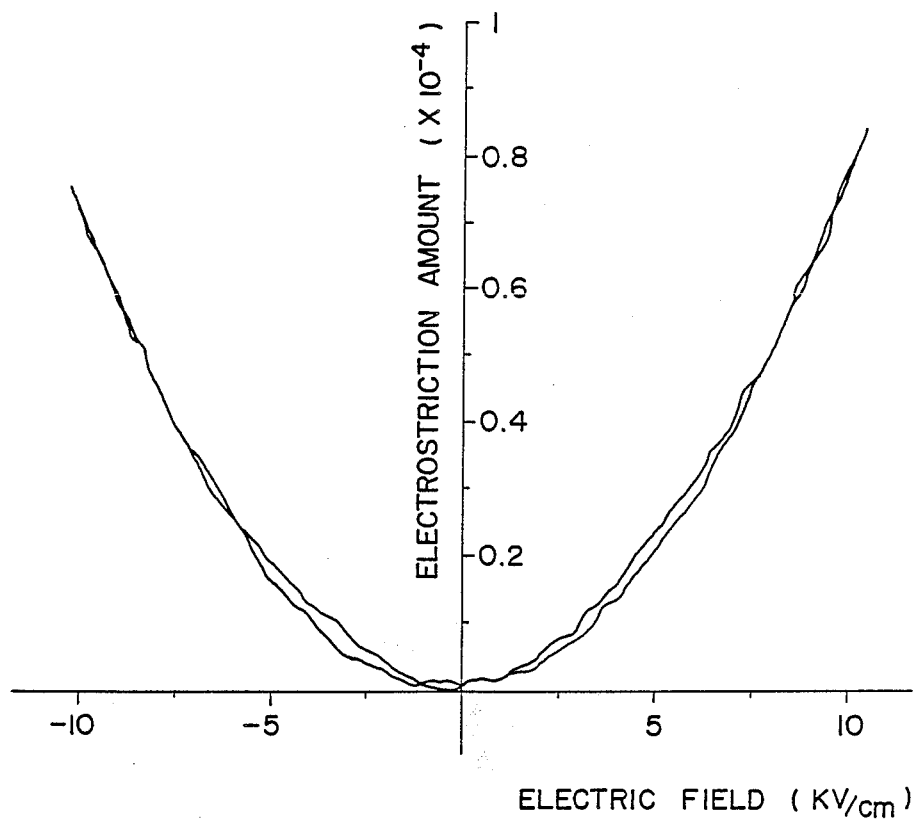
FIG. 9 is graph showing characteristic curves indicating variations of electrostriction with electric field.

FIG. 9 indicates electrostriction of the sample of Example 38. The electrostriction was obtained by detecting the displacement of a longitudinal effect by means of a contact-type potentiometer for displacement detection and recording it as a function of the applied electric field of the sample by means of an XY recorder. The sample was in the form of a disk having a thickness of 1.00 mm and a diameter of 12.00 mm. The samples used were electrodes obtained by printing as electrodes a silver paste on both surfaces of each sample at a temperature of 800° C.

The relationship between electrostriction and electric field produces a curve of quadratic expression in which almost no hysteresis is observable. When an electric field of 10 KV/cm is applied, the sample exhibits a longitudinal effect electrostriction of $0.85 \times 10^{-4}$. As is apparent from FIG. 9, the ceramic composition of the present invention can be also used as a material for multilayer ceramic actuators.

FIG. 10 is an X-ray diffraction pattern of the composition of Example 15. This composition exhibits substantially complete perovskite phases. Accordingly, the composition of Example 15 has a dielectric constant of 6,300 and CR products of 6,500 MΩ.μF (at 25° C.) and 4,000 MΩ.μF (at 125° C.), which are excellent values. In contrast, the composition of Reference Example 6 the Pb sites of which are not substituted by Ba exhibits a large amount of pyrochlore phases as shown in FIG. 11. Accordingly, its dielectric constant is as small as 990, and its CR product is extremely small, i.e., 150 MΩ.μF (at 25° C.). Thus, the composition of Reference Example 6 is quite impractical.

Figure 12:
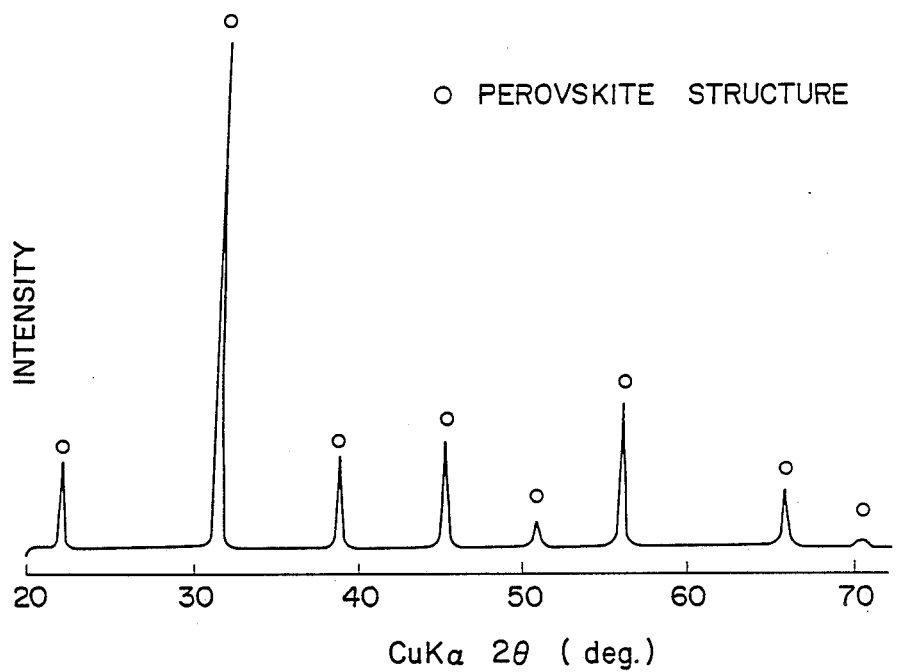
Figure 13:
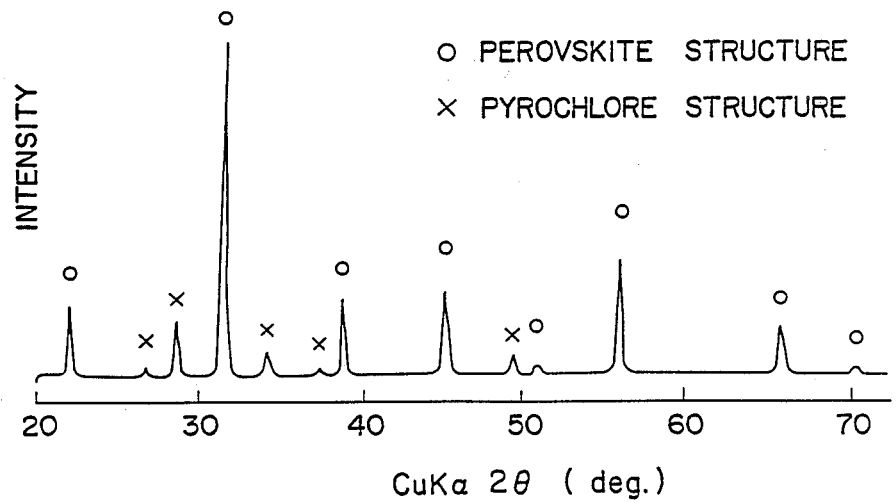

FIG. 12 is an X-ray diffraction pattern of the composition of Example 38. This composition exhibits substantially complete perovskite phases. Accordingly, it has a dielectric constant of 11,000 and CR products of 34,000 MΩ.μF (at 25° C.) and 6,000 MΩ.μF (at 125° C.), which are excellent values. In contrast, the composition of Reference Example 3 the Pb sites of which are not substituted by Ba exhibits a large amount of pyrochlore phases as shown in FIG. 13. Accordingly, its dielectric constant is as small as 4,500, and its CR product is extremely small, i.e., 620 MΩ.μF (at 25° C.). Thus, the composition of Reference Example 3 is quite impractical.

Examples wherein multilayer ceramic capacitors were prepared by using the composition of Example 12; a composition obtained by additionally incorporating 0.25 mole % of MnO and 0.25 mole % of CoO into the composition of Example 12; the composition of Example 38; and a composition obtained by additionally incorporating 0.1 mole % of MnO and 0.1 mole % of CoO into the composition of Example 38 will now be described.

First, a binder, and an organic solvent were added to a dried powder having each of these compositions to prepare a slurry. The slurry was then formed into a green sheet having a thickness of 30 micrometers by means of a doctor blade-type caster. An 80 Ag/20 Pd electrode paste was printed on each green sheets in the form of a specific pattern. Twenty sheets having such electrode patterns were laminated and pressed and thus caused to adhere together. Thereafter, the laminate was cut into a specific shape, and a burn-out operation was carried out, after which a sintering process was carried out at 1020° C. under conditions of 2H. After sintering, an Ag paste was printed as an external electrode to produce a multilayer ceramic capacitor. The electrical characteristics of the capacitors thus fabricated are shown in the following Tables 5 and 6.

Table 5 shows the electrical characteristics of the multilayer ceramic capacitors which were produced from the composition of Example 12 and the composition obtained by adding MnO and CoO to the composition of Example 12. Table 6 shows the electrical characteristics of the multilayer ceramic capacitors which were produced from the composition of Example 38 and the composition obtained by adding MnO and CoO to the composition of Example 38.

TABLE 5

|  | Example 12 | Example 12 + 0.25 mole % MnO + 0.25 mole % CoO |
|---|---|---|
| Size | 1.6 × 3.2 × 0.9 (mm) | 1.6 × 3.2 × 0.9 (mm) |
| Thickness per layer | 20 (μm) | 20 (μm) |
| Capacitance | 0.18 (μF) | 0.18 (μF) |
| Dielectric Loss | 1.4 (%) | 1.3 (%) |
| Insulation Resistance | $1.7 \times 10^5$ (MΩ) | $1.8 \times 10^5$ (MΩ) |
| Capacitance-Resistance Product (CR) | | |
| (25° C.) | 27,000 (MΩ · μF) | 32,000 (MΩ · μF) |
| (125° C.) | 9,000 (MΩ · μF) | 13,000 (MΩ · μF) |
| Temperature Characteristics of Dielectric Constant | | |
| (−25° C.) | −14 (%) | −13 (%) |
| (85° C.) | −14 (%) | −14 (%) |

TABLE 6

|  | Example 38 | Example 38 + 0.1 mole % MnO + 0.1 mole % CoO |
|---|---|---|
| Size | 1.6 × 3.2 × 0.9 (mm) | 1.6 × 3.2 × 0.9 (mm) |
| Thickness per layer | 20 (μm) | 20 (μm) |
| Capacitance | 0.3 (μF) | 0.3 (μF) |
| Dielectric Loss | 0.7 (%) | 0.5 (%) |
| Insulation Resistance | $1.3 \times 10^5$ (MΩ) | $1.7 \times 10^5$ (MΩ) |

TABLE 6-continued

|  | Example 38 | Example 38 + 0.1 mole % MnO + 0.1 mole % CoO |
|---|---|---|
| Capacitance-Resistance Product | | |
| (25° C.) | 34,000 (MΩ · μF) | 45,000 (MΩ · μF) |
| (125° C.) | 6,000 (MΩ · μF) | 10,000 (MΩ · μF) |
| Temperature Characteristics of Dielectric Constant | | |
| (−25° C.) | −40 (%) | −38 (%) |
| (85° C.) | −44 (%) | −43 (%) |

The dielectric constant of the multilayer ceramic capacitor produced from the composition obtained by adding MnO and CoO to the composition of Example 12 is about 6,500. As can be seen from Table 5, each characteristic is amply excellent. Particularly, the temperature characteristics are within ±15% at a temperature of from −25° to 85° C. and satisfy C characteristics of EIAJ and Y5R characteristics of EIA. While multilayer ceramic capacitors having satisfactory electrical characteristics can be produced from the composition of Example 12, it is apparent that multilayer ceramic capacitors having even further improved electrical characteristics can be produced from the composition containing additionally MnO and CoO.

Further, the dielectric constant of the multilayer ceramic capacitors produced from the composition obtained by adding MnO and CoO to the composition of Example 38 is about 11,000. As can be seen from Table 6, each characteristic is amply excellent. Particularly, T.C.C. is within ±50% at a temperature of from −25° to 85° C. and satisfies E characteristics of JIS and Z5U characteristics of EIA. Also, in this case, it will be apparent that the addition of MnO and CoO can improve electrical characteristics as compared to those without MnO and CoO.

Thus, the high dielectric constant type ceramic compositions according to the present invention have various excellent characteristics such as T.C.C. and are particularly effective and useful as materials for multilayer ceramic capacitors.

We claim:

1. A high dielectric constant ceramic composition for a ceramic capacitor, represented by the general formula:

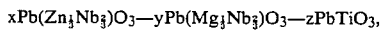

$xPb(Zn_{\frac{1}{3}}Nb_{\frac{2}{3}})O_3 - yPb(Mg_{\frac{1}{3}}Nb_{\frac{2}{3}})O_3 - zPbTiO_3,$ wherein x, y and z have the values defined within lines connecting the following points a, b, c, and d of a ternary composition diagram of said compound having apexes of respective components, and wherein from 1 to 35 mole % of said Pb is substituted by an alkali earth element selected from the group consisting of barium, strontium and combinations thereof:

a: (x=0.50, y=0.00, z=0.50)

b: (x=1.00, y=0.00, z=0.00)

c: (x=0.45, y=0.55, z=0.00)

d: (x=0.15, y=0.70, z=0.15)

and z is about 0.05 or more, and y is about 0.01 or more.

2. The high dielectric constant ceramic composition according to claim 1 which further comprises at least one of manganese oxide and cobalt oxide which is additionally included therein in an amount of up to 0.5% by weight.

3. The high dielectric constant ceramic composition according to claim 2, wherein the amount of at least one of manganese oxide and cobalt oxide additionally included therein is from 0.01% to 0.5% by weight.

4. The high dielectric constant ceramic composition according to claim 1, wherein a portion of the Pb of the composition with proportions of said components on a line connecting points a and b of the ternary composition diagram of FIG. 1 is substituted by from 10 to 35 mole % of at least one of barium and strontium.

5. The high dielectric constant ceramic composition according to claim 1, wherein d is $d_3$ (x=0.20, y=0.60, z=0.20).

6. A ceramic capacitor produced by using a high dielectric constant ceramic composition represented by the general formula:

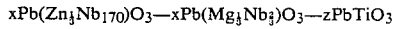

$xPb(Zn_{\frac{1}{3}}Nb_{\frac{2}{3}})O_3 - xPb(Mg_{\frac{1}{3}}Nb_{\frac{2}{3}})O_3 - zPbTiO_3$ wherein x, y and z have the values defined within lines connecting the following points a, b, c, and d of a ternary composition diagram of said compound having apexes of respective components, and wherein from 1 to 35 mole % of said Pb is substituted by an alkali earth element selected from the group consisting of barium, strontium, and combinations thereof:

a: (x=0.50, y=0.00, z=0.50)

b: (x=1.00, y=0.00, z=0.00)

c: (x=0.45, y=0.55, z=0.00)

d: (x=0.15, y=0.70, z=0.15)

and z is about 0.05 or more, y is about 0.01 or more.

7. The ceramic capacitor according to claim 6, wherein said capacitor is a multilayer.

8. The ceramic capacitor according to claim 7, wherein Ag or a Ag-based alloy containing more than 70 wt % of Ag is used as an internal electrode.

9. The ceramic capacitor according to claim 8, wherein the Ag-based alloy is Ag-Pd alloy or Ag-Au-Pd alloy.

10. The ceramic capacitor according to claim 6, wherein the ceramic composition which further comprises at least one of manganese oxide and cobalt oxide which is additionally included therein in an amount of up to 0.5% by weight.

11. The ceramic capacitor according to claim 10, wherein the amount of at least one of manganese oxide and cobalt oxide additionally included therein is from 0.01% to 0.5% by weight.

12. The ceramic capacitor according to claim 6, wherein a portion of the Pb of the composition with proportions of said components on a line connecting points a and b of the ternary composition diagram of FIG. 1 is substituted by from 10 to 35 mole % of at least one of barium and strontium.

13. The ceramic capacitor according to claim 6, wherein d is $d_3$ (x=0.20, y=0.60, z=0.20).

14. The ceramic capacitor according to claim 7, wherein the ceramic composition which further comprises at least one of manganese oxide and cobalt oxide which is additionally included therein in an amount of up to 0.5% by weight.

15. The ceramic capacitor according to claim 14, wherein the amount of at least one of manganese oxide and cobalt oxide additionally included therein is from 0.01% to 0.5% by weight.

16. The ceramic capacitor according to claim 7, wherein a portion of the Pb of the composition with proportions of said components on a line connecting points a and b of the ternary composition diagram of FIG. 1 is substituted by from 10 to 35 mole % of at least one of barium and strontium.

17. The ceramic capacitor according to claim 7, wherein d is $d_3$ (x=0.20, y=0.60, z=0.20).

* * * * *